United States Patent

[11] 3,612,889

[72] Inventor Robert Andrew Diamond
Oxford, England

[21] Appl. No. 749,014
[22] Filed July 31, 1968
[45] Patented Oct. 12, 1971
[73] Assignee Vickers Limited
London, England

[54] APPARATUS FOR MARKING THE LOCATION OF INDICIA ON A FILM
7 Claims, 3 Drawing Figs.

[52] U.S. Cl. .......... 250/219 R,
250/219 F, 356/199
[51] Int. Cl. .......... G01n 21/30
[50] Field of Search .......... 250/219 F,
219 I, 219 D, 83.30; 346/78, 141; 356/199;
235/61.11 E; 178/7.6 D, DIG. 1

[56] References Cited

UNITED STATES PATENTS

| | | | |
|---|---|---|---|
| 2,968,793 | 1/1961 | Bellamy | 346/SR |
| 3,067,646 | 12/1962 | Reesen | 250/219 F X |
| 3,298,029 | 1/1967 | Silverman | 346/SR |
| 3,347,131 | 10/1967 | Clauer et al. | 250/219 I X |
| 3,445,672 | 5/1969 | Marks | 250/219 D |
| 3,458,707 | 7/1969 | Nichols | 250/219 D |
| 3,413,065 | 11/1968 | Funk | 356/202 |

*Primary Examiner*—James W. Lawrence
*Assistant Examiner*—D. C. Nelms
*Attorney*—Pennie, Edmonds, Morton, Taylor and Adams

ABSTRACT: Apparatus for scanning a trace, containing a number of indicia of varying characteristics, deposited on a tape as the tape moves through the apparatus, for producing photoelectrically a series of pulses representing the scanned indicia and for electronically selecting certain of these pulses corresponding to indicia having certain predetermined characteristics and feeding these pulses to a marking device which marks the positions of these indicia on the tape.

Inventor
Robert Andrew Diamond
By
Pennie, Edmonds, Morton, Taylor & Adams
Attorneys

APPARATUS FOR MARKING THE LOCATION OF INDICIA ON A FILM

The present invention relates to the marking of the location on a tape or film of indicia having a predetermined characteristic.

One object of the invention is to mark the position of an indicium having a predetermined characteristic in order that the indicium may be quickly found again.

According to the present invention there is provided for use with a tape carrying a series of indicia of varying characteristics apparatus for marking the location of indicia on the tape of a predetermined characteristic, comprising a. an optical scanner for scanning said indicia,
b. a photosensitive device for producing signals proportional in amplitude and duration to the intensity and duration respectively of light from said indicia being scanned,
c. first selection means for selecting those signals having amplitudes within a predetermined range,
d. second selection means for selecting those of the first selected signals having durations falling within a predetermined range, and
e. a device responsive to the second selected signals for marking the location of the indicia corresponding to the second selected signals.

Figure 2:
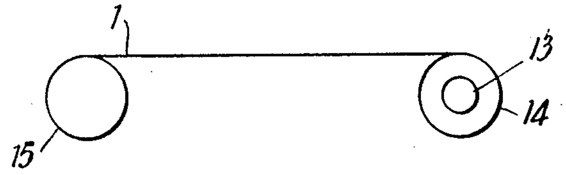
Figure 1:
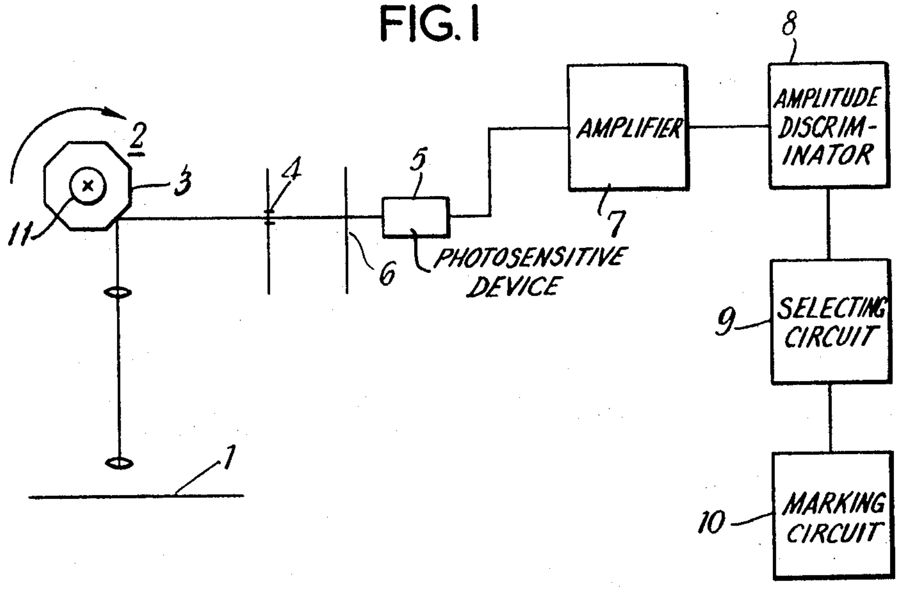
Figure 3:
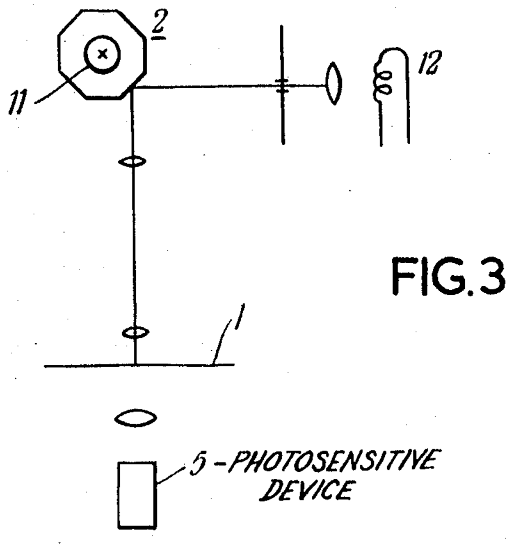

In order that the invention may be more clearly understood two embodiments of the invention will now be described, by way of example, with reference to the accompanying drawings in which:

FIG. 1 shows apparatus for scanning indicia on a tape and for marking the position of certain of the scanned indicia, FIG. 2 shows an arrangement for moving the tape past the optical scanner, and FIG. 3 shows an alternative form of optical scanner to that shown in FIG. 1.

Referring to FIG. 1 a tape 1 is scanned by a rotatable block 2 having a number of reflecting faces 3 and driven by a motor 11. The block 2 is arranged in relation to the tape 1 such that the direction of movement of the tape 1 is parallel to the direction of the rotational axis of the block 2. The tape 1 is drawn, for example, form a feed reel 15 onto a takeup reel 14 by means of a motor 13 as shown in FIG. 2. The reflection of the tape 1 in a reflecting face 3 of the block is projected through a fixed aperture 4 in an image plane and falls on a photosensitive device 5. A neutral filter holder 6 is interposed between the scanning block 2 and the photosensitive device 5, the object of which is to set the sensitivity of the scanner. The tape 1 is thereby effectively split into a number of zones which are reflected sequentially on to the photosensitive device 5 as the tape 1 moves and the block 2 rotates.

The photosensitive device 5, which is a photomultiplier, emits pulses proportional in amplitude and duration to the light intensity and size respectively of the scanned indicia on the tape 1. The pulses are fed into an amplifier 7 and the amplified pulses are then fed to an amplitude discriminator 8. Pulses which exceed the trigger setting of the discriminator are changed into square waveform, whose duration is proportional to the size of the indicia they represent. The setting of the amplitude discriminator determines the sensitivity of the probe or aperture.

The square-wave pulses are then fed to a selecting circuit 9 which is set such that only pulses of duration above a predetermined minimum time and below a predetermined maximum time are allowed through. The pulses allowed through energize a marking device 10 which marks the tape 1, for example, by making a hole in it.

An indicium on the film therefore which has the correct predetermined characteristics will result in a pulse which passes through both the amplitude discriminator 8 and the selecting circuit 9 and energizes the marking device 10 to mark the tape 1. An indicium on the tape 1 which does not have the correct predetermined characteristics will result in a pulse which will be cut out either by the amplitude discriminator 8 or by the selecting circuit 9 and the marking device 10 will not be energized.

On completion of the examination of the indicia the tape 1 may be played back and will automatically stop at a marking point thus allowing for further examination of an indicium corresponding to that marking point.

In one application, the indicia are traces of specimens of cellular or particulate substance for example specimens taken in diagnosis by exfoliative cytology, and the specimens drawn on the tape for microscopic examination.

Referring to FIG. 3 the film may alternatively be scanned, at right angles to its direction of movement, by a light probe. In this case the photomultiplier 5 is disposed on the opposite side of the tape 1 to that of the rotatable block 2. A source of light 12 emits a beam of light which is reflected by the block 2 through the tape 1 and onto the photomultiplier 5.

What is claimed is:

1. Apparatus for locating indicia of a predetermined characteristic on a tape carrying a series of indicia of varying characteristics and for marking the located indicia on the tape, comprising a. an optical scanner for scanning said series of indicia,
b. a photosensitive device for producing signals proportional in amplitude and duration to the intensity and size respectively of the indicia being scanned,
c. first selection means for selecting those signals produced by said device having amplitudes within a predetermined range,
d. second selection means for receiving and selecting those of the first selected signals having durations falling within a predetermined range, and
e. a device responsive to the second selected signals for marking on the tape the location of the indicia corresponding to the second selected signals.

2. Apparatus according to claim 1 in which said photosensitive device comprises a photomultiplier.

3. Apparatus according to claim 1 further comprising conversion means for converting said first selected signals to square waveform before said signals are received by said second selection means.

4. Apparatus according to claim 3 further comprising means for moving said tape past said optical scanner and in which said optical scanner comprises a light probe which is adapted to scan said tape in a direction at right angles to the direction of movement of said tape.

5 Apparatus according to claim 3 further comprising means for moving said tape past said optical scanner and in which said optical scanner comprises a block, having a number of reflecting surfaces, adapted to rotate about an axis parallel to the direction of movement of said tape.

6. Apparatus according to claim 3 further comprising means in an image plane incorporating an aperture interposed between said optical scanner and said photosensitive device.

7. Apparatus according to claim 6, further comprising a filter holder interposed between said optical scanner and said photosensitive device.